(No Model.)
T. SMITH.
TONGS.
No. 490,510. Patented Jan. 24, 1893.
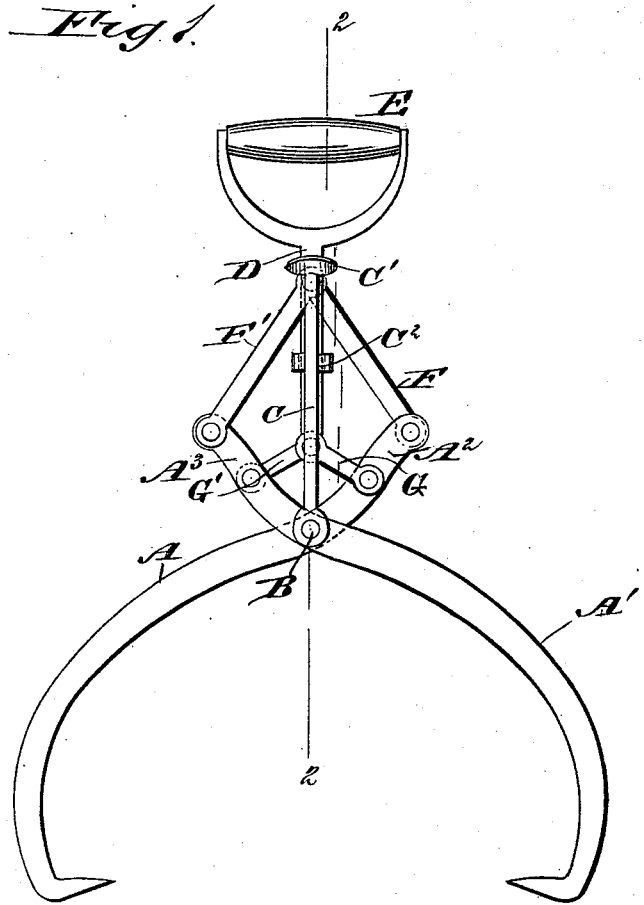
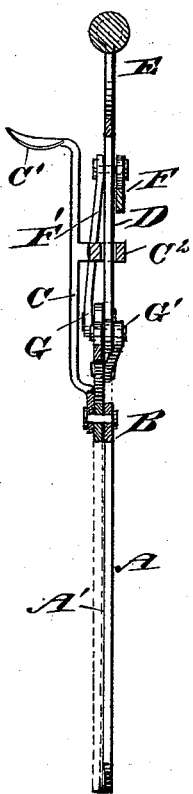
WITNESSES:
F. McArdle
C. Sedgwick
INVENTOR
T. Smith
BY Munn & Co
ATTORNEYS.

UNITED STATES PATENT OFFICE.

THOMAS SMITH, OF BRECKENRIDGE, MISSISSIPPI.

TONGS.

SPECIFICATION forming part of Letters Patent No. 490,510, dated January 24, 1893.

Application filed July 9, 1892. Serial No. 439,470. (No model.)

*To all whom it may concern:*

Be it known that I, THOMAS SMITH, of Breckenridge, in the county of Caldwell and State of Mississippi, have invented a new and useful Improvement in Tongs, of which the following is a full, clear, and exact description.

The object of the invention is to provide a new and useful improvement in tongs, which is simple and durable in construction and more especially designed for conveniently grappling, securely holding and easily carrying, articles such as ice, kegs, boxes, &c.

The invention consists of a bar carrying the pivot of the tong legs or tines and formed with a bearing, and a handle bar fitted to slide in the said bearing and pivotally connected by two sets of links with the said tong legs or tines.

The invention also consists of certain parts and details, and combinations of the same, as will be hereinafter described and then pointed out in the claims.

Reference is to be had to the accompanying drawings forming a part of this specification, in which similar letters of reference indicate corresponding parts in all the figures.

Figure 1 is a side elevation of the improvement; and Fig. 2 is a transverse section of the same on the line 2—2 of Fig. 1.

The improved tongs is provided with the two legs or tines A, A′, formed at their lower ends with inwardly-extending points, the legs being curved, as shown in Fig. 1. The legs A and A′ have their pivot B, attached to a bar C, extending upwardly and formed at its upper end with a finger piece C′, and on one side of the said bar is formed a bearing $C^2$, in which is fitted to slide vertically the handle bar D, provided at its upper end with a suitably constructed handle E. The handle bar D is pivotally connected by two sets of links F, F′, and G, G′, with the upper projecting ends $A^2$ and $A^3$, of the legs or tines A, A′, respectively, the set of links F, F′, being connected with the extreme ends of the said legs while the other set of shorter links G, G′, connect with the ends $A^2$, $A^3$ about midway between the pivot B and the pivots for the links F, F′. In using the device, the operator takes hold of the finger piece C′ and by pressing or moving the handle E downward, the links F, F′ and G, G′ bear on the upper ends $A^2$ and $A^3$ of the legs A and A′ so as to open the same to conveniently grapple the article to be carried. By moving the handle E, then upwardly the handle bar D slides in the same direction and by the links F, F′ and G, G′, closes the legs A, A′, which latter swing toward each other with their pointed ends, thus securely engaging the article at opposite sides.

In order to release the grappled article, the operator throws the weight of the article on one of the legs A or A′ for tilting the tongs sidewise, whereby a swinging motion is given to that respective leg, whereby the links of the said leg cause a downward sliding of the handle bar D and consequent opening of the other leg by its links connected with the said handle bar.

It will be seen that the device is very simple and durable in construction, and can be easily manipulated to grapple the article, for holding and carrying the same. It will further be seen that by this said construction described, the article can be readily disengaged by simply changing the position of the tongs so as to throw the weight of the article on one of the legs only.

Having thus fully described my invention, I claim as new and desire to secure by Letters Patent:

1. Tongs comprising curved legs, a bar carrying the pivot for the said legs and formed with a bearing, a handle bar fitted to slide in the said bearing, and sets of links connecting the said handle bar with the said legs, substantially as shown and described.

2. Tongs comprising two curved legs having their ends projecting beyond their pivot and provided with inwardly extending points, a bar formed with a finger piece and carrying the pivot for the said legs, a bearing formed on the said bar, a handle bar fitted to slide in the said bearing, and two sets of links connecting the said handle bar with the legs, substantially as shown and described.

THOMAS SMITH.

Witnesses:
P. A. PRICE,
H. M. PAGE.

Correction in Letters Patent No. 490,510.

It is hereby certified that the residence of the patentee in the grant and in the printed specification of Letters Patent No. 490,510, granted January 24, 1893, upon the application of Thomas Smith for an improvement in "Tongs," was erroneously written and printed "Breckenridge, Mississippi," whereas said residence should have been written and printed *Breckenridge, Missouri*, and that the said Letters Patent should be read with this correction therein that the same may conform to the record of the case in the Patent Office.

Signed, countersigned, and sealed this 14th day of February, A. D. 1893.

[SEAL.]
CYRUS BUSSEY,
*Assistant Secretary of the Interior.*

Countersigned:
W. E. SIMONDS,
*Commissioner of Patents.*